May 19, 1959
C. R. GARNER
2,887,302
BIT AND CUTTER THEREFOR
Filed Aug. 31, 1956
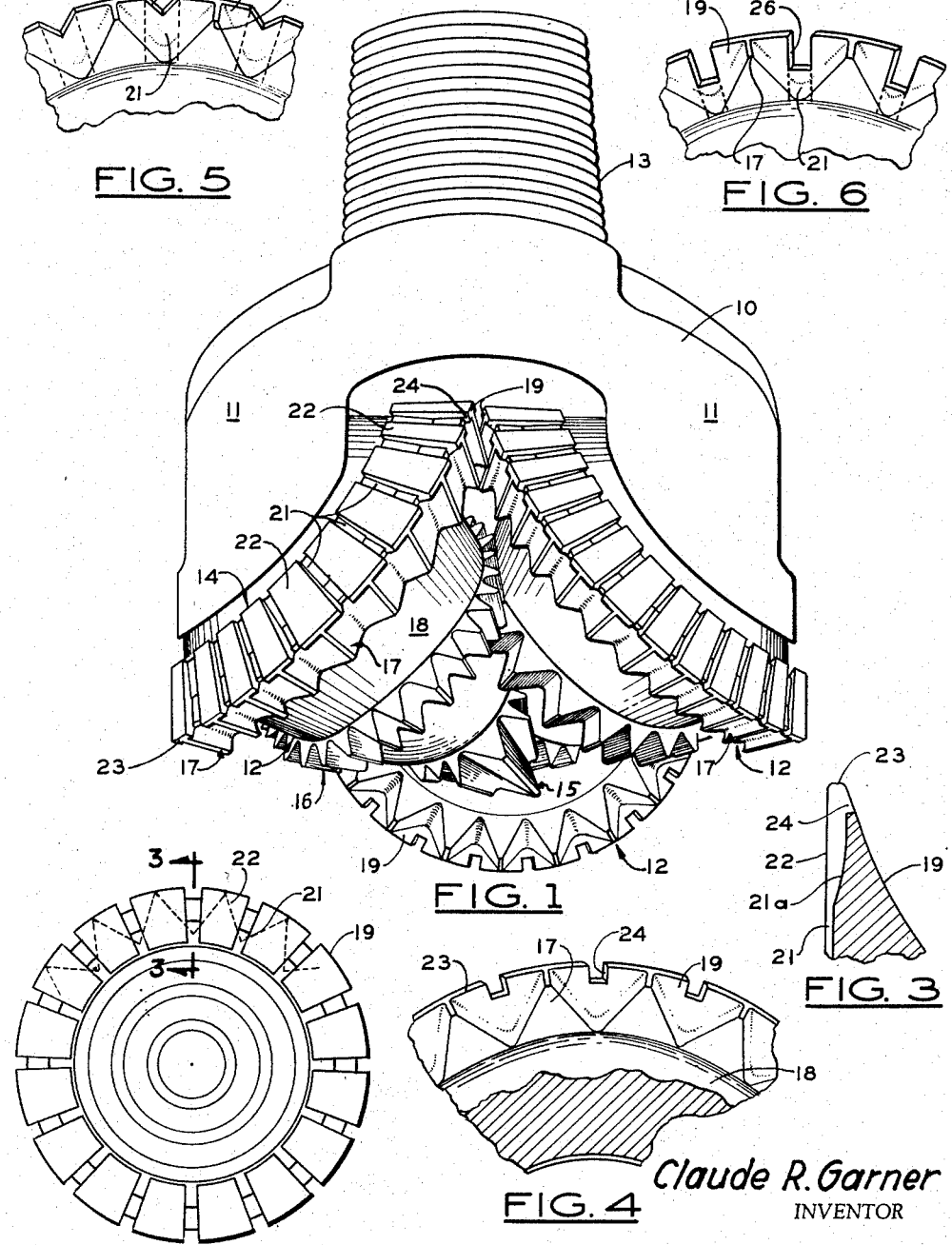
Claude R. Garner
INVENTOR
BY
ATTORNEYS

United States Patent Office

2,887,302
    Patented May 19, 1959

2,887,302

BIT AND CUTTER THEREFOR

Claude R. Garner, Odessa, Tex., assignor to Dresser Operations, Inc., Whittier, Calif., a corporation of California Application August 31, 1956, Serial No. 607,359

8 Claims. (Cl. 255—349)

This invention relates to drill bits for earth boring and more particularly to bits employing cutters which rotate on the bottom of a hole being dug upon rotation of the bit.

In drilling hard consolidated earth formations, cutters are used which chip and crush away the bottom of a hole. The cutters form rock teeth in the bottom of the hole and upon continued rotation of the bit, chip and crush away the rock teeth. The rock teeth formed adjacent the gauge of the hole are difficult to remove as they are supported by the side wall of the hole. As a result, the point of greatest wear on a cutter tends to be at the shank teeth and it is difficult to prevent excessive wear of the gauge face of the cutter. Due to the forces involved in drilling, cutter teeth are sometimes broken off and when shank teeth are broken off, the problem of maintaining gauge is accentuated.

Efforts to prolong the drilling life of bits have included the provision of a web forming a continuation of the gauge face of the cutter and interconnecting adjacent shank teeth to strengthen the teeth. Grooves have been cut in the gauge face of cutters to permit cuttings to be washed from the gauge face of the cutter by drilling fluid. These features have been combined in a manner to provide a cutter in which some of the teeth were bridged by a web to strengthen them leaving the space between other teeth open, and in which grooves were provided in the gauge face of the cutter communicating with the space between the unbridged teeth.

It has generally been thought that when cutters are equipped with webs, the individual web sections or the relationship between the shank teeth and the web sections, etc. must be asymmetrical in some way to prevent tracking of the web. It has been discovered that this is not necessarily true as the webs and grooves may be formed symmetrical and web tracking is no problem with cutters constructed in accordance with this invention.

It is an object of this invention to provide a cutter of the type having a web interconnecting all shank teeth at the gauge face of the cutter with an arrangement of mud grooves and modification of the web which will enable the web to more efficiently cut the gauge wall and establish fluid communication between the grooves and spaces between adjacent shank teeth.

Another object is to provide a cutter having a gauge cutting web and a gauge face having grooves extending to the periphery of the web in which the web and the gauge face are symmetrical in form and in arrangement relative to the shank teeth.

Another object is to provide a cutter having a web joining adjacent shank teeth together at the shank end thereof and with a mud groove in the gauge face extending to the periphery of the web in which means is provided for establishing fluid communication between the groove and space between the shank teeth without substantially impairing the strength of the web or its function of supporting the shank teeth against breakage.

Another object is to provide a cutter having a web interconnecting the shank teeth at their shank ends and a plurality of mud grooves in the gauge face and web of the cutter so fashioned that the mud grooves will not disappear from the web with wear.

Another object is to provide a cutter having a gauge cutting web interconnecting each pair of shank teeth on the cutter which cuts with both a scraping and a chiseling action.

Another object is to provide a cutter having a gauge cutting web interconnecting each pair of shank teeth at the shank ends of such teeth in which the web is formed to provide scraper teeth in the peripheral face of the web.

Another object is to provide a cutter having mud grooves in its gauge face in which the cutting action of the teeth provided by the grooves is much more effective than heretofore possible.

Another object is to provide a cutter having a gauge cutting web with more sharp corners than heretofore thought possible to increase the scraping or biting in action of the web.

Other objects, features and advantages of the invention will be apparent from the drawing, specification and claims.

In the drawing wherein illustrative embodiments of this invention are shown and wherein like reference numerals indicate like parts:

Fig. 1 is a perspective view of a bit constructed in accordance with this invention;

Fig. 2 is an elevational view on a reduced scale of the heel end of the cutters shown in Fig. 1;

Fig. 3 is a view on an enlarged scale along the lines 3—3 of Fig. 2 in the direction of the arrows;

Fig. 4 is a perspective view of a fragment of one of the cutters of the bit of Fig. 1;

Fig. 5 is a fragmentary view similar to Fig. 3 illustrating a modified cutter; and Fig. 6 is a further fragmentary view similar to the views of Figs. 4 and 5 illustrating a still further modified cutter.

The bit of Fig. 1 includes a body 10 having downwardly projecting legs 11 on which the cutters indicated generally at 12 are rotatably mounted. An upstanding threaded pin 13 is provided for connecting the bit to a drill collar or drill stem.

The cutters may take any desired form which will roll on the bottom of the hole being cut. The cutters illustrated are generally conical in shape and the mounting of the cutters on legs 11 is such that the end face of the conical cutter which provides the gauge face indicated generally at 14 cuts the gauge of the hole. With the cutter so mounted, the side wall of the conical cutter cuts the bottom of the hole being dug. One or more cutters may be employed. Three cutters mounted as illustrated are preferred. The three cutters may be identical in form or one or two of the cutters may be constructed in accordance with this invention and one or two of the cutters differently constructed such as, for instance, by providing one cutter with a differently formed gauge cutting web.

The nose teeth 15 and intermediate teeth 16 of the cutters are formed in the conventional manner as are the bearing mountings (not shown) for the individual cones. The shank teeth 17 are also formed in a generally conventional manner.

In order to strengthen shank teeth 17 and to assist in maintaining gauge, a circumferential web 19 is provided and extends radially outwardly from the body 18 of the cutter. Web 19 joins adjacent shank teeth 17 together at their shank ends and preferably is continuous about each cutter and joins all adjacent shank teeth together to strengthen the teeth. By locating the web 19 at the shank end of the shank teeth, the web will form a continuation of the normal gauge face on the cutter and will provide additional wear and cutting surface in engagement with the side wall of the hole to prolong the life of the cutter.

In order to provide cutting edges on the gauge face of the cutter and to remove cuttings therefrom, a plurality of grooves 21 are cut in the gauge face of the cutter and extend outwardly through the web 19 and substantially radially of the rotational axis of the cutter. Pads 22 are formed by the cutting of grooves 21 and are preferably hard surfaces to resist wear. The grooves 21 are preferably formed with their side walls extending perpendicular to the gauge face to provide sharp shaving edges which will shave the side wall of the hole as the cutter rotates. The grooves 21 collect shavings from the side wall and cuttings from the bottom of the hole and prevent this material from binding between the pads 22 and the side wall of the hole being drilled. Drilling fluid circulating through the bit serves to wash the accumulated material from grooves 21 and prevents their becoming clogged.

Referring particularly to Fig. 3, it will be noted that the inner wall of web 19 slopes inwardly and away from the gauge face to provide, particularly in the inner section of the web, a strong web of material interconnecting shank teeth 17 to strengthen these teeth against damage during drilling. The thickening of the web at its base also provides the necessary strength for the web to function as cutting teeth.

The rock teeth adjacent the side wall of the hole are preferably disconnected from the side wall of the hole so that they will be more easily chipped away. For this purpose, the web 19 preferably extends to approximately the crown of shank teeth 17 and cuts a groove between the rock teeth adjacent the side wall of the hole and the side wall of the hole. In carrying out this objective, the web is formed to produce both a chiseling action and a cutting or shaving action. The peripheral face 23 of the web functions in the manner of a chisel to sever rock teeth from the side wall of the hole.

Shaving teeth are provided to assist in severing the rock teeth from the side wall of the hole by a plurality of notches 24 in the peripheral edge 23 of web 19 and by the grooves 21. These notches and grooves are formed with side walls extending substantially radially of the axis of rotation of the cutter. The notches are relatively shallow as best shown in Fig. 4 to leave a large area of web to reinforce the shank teeth. In other words, the bottoms of the notches are spaced from the roots of the shank teeth. As the cutter rotates, the rocking action of the cutting edge provided by notch 24 tends to shave out the rock teeth and this assists the chisel face of the web in severing the rock teeth from the side wall.

In order to provide for maximum circulation of fluid through grooves 21, the notches 24 interconnect grooves 21 and the valleys between adjacent shank teeth 17. This arrangement also permits the portion of the groove immediately inward from the notch to function as a shaving cutter to assist in interrupting the continuity of the rock teeth and the side wall of the hole.

Referring now to Fig. 3, it will be noted that the groove is deepened throughout the area of the web as indicated at 21a. That is, it is deeper at the web than it is in the body of the cutter. This arrangement insures that a groove will remain in the exterior wall of the web with wear of the pads 22 and a cutting edge will be present at this point until the bit is worn beyond use. It is also pointed out that the bottom of notches 24 will tend to wear away at substantially the same rate as the cutting edge of web 19 and therefore the notches 24 will always be present in the web.

In the past, it has always been thought that special provision must be made to prevent tracking of the web 19. With the web constructed as explained herein, tracking is no problem and special provision need not be provided to prevent tracking. For instance, it will be noted that there is an equal number of pads and grooves and that the number of pads and grooves equal the number of shank teeth on each cutter. The pads and grooves are of uniform size as are the shank teeth. Preferably, the grooves and notches are in line with the valleys between adjacent shank teeth and the shank teeth and web are entirely symmetrical. Furthermore, the shank teeth and web on each of the cutters on a bit may be entirely symmetrical and identical with each other. While a bit having all cutters constructed as explained herein will give the best result, it is of course apparent that one or more of the cutters could be made in another form as perhaps by the use of a web in which the notches 24 are omitted or the like.

Referring now to Fig. 5, a slightly modified form of cutter is shown. In this case, the notches 24 are replaced by V-shaped notches 25. This form of notch has been found to do a satisfactory job but is not as effective as the parallel side wall notch 24.

Fig. 6 shows a still further modification in which the notch 24 is replaced by a notch 26 which has parallel side walls but is cut much deeper into the web. This notch performs satisfactorily but has been found that the web at the notch tends to round off in use and therefore shallow notches such as notches 24 are preferred.

From the above, it will be seen that the objects of this invention have been accomplished. The cutter will have a higher initial drilling rate due to its lesser area of cutting surface in engagement with the bottom of the hole as compared with a bit which has a continuous or nearly continuous cutting web.

Due to the large number of grooves 21, there will be a smaller total area of pads on the gauge end of the cutter than on a conventional web type cutter having a continuous web, and hence will be less susceptible of a pinching action in the hole. Due to the provision of cutters in the web which have a shaving as well as chiseling action, the cutter will do a more effective job of cutting away the formation adjacent the side wall of the hole. These cutters provide a large number of corners which come in contact with the gauge surface and shave it away.

Even though notches and grooves are provided in the web, it is left strong enough to reinforce the shank teeth and of course to break the continuity between the rock teeth formed on the bottom of the hole and the side wall of the hole. The feature of cutting the groove in the web portion of the gauge face a little deeper than in the body of the cutter permits more wear to take place on the gauge surface of the cutter without destroying the presence of the cutting edges provided by the grooves.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawing is to be interpreted as illustrative and not in a limiting sense.

The invention having been described, what is claimed is:

1. A rotary bit comprising, a body, a rolling cutter rotatably mounted on the body for rolling contact with the bottom of a hole being dug, one end face of the cutter providing a gauge face positioned to cut the side wall of a hole, a row of shank teeth arranged circumferentially about the heel end of and extending longitudinally of the cutter, a circumferential web extending outwardly from the cutter body to approximately the crest of the shank teeth and interconnecting at least a pair of shank teeth at the heel end thereof, said web forming a continuation of the gauge face of the cutter, and a notch extending through the peripheral edge of the web and opening into the space between adjacent shank teeth, the bottom of said notch being spaced from the root of said teeth.

2. The bit of claim 1 wherein the side walls of the notch extend substantially radially of the rotational axis of the cutter.

3. A rotary bit comprising, a body, a rolling cutter rotatably mounted on the body for rolling contact with the bottom of a hole being dug, one end face of the cutter providing a gauge face positioned to cut the side wall of a hole, a row of shank teeth arranged circumferentially about the heel end of and extending longitudinally of the cutter, a circumferential web extending outwardly from the body of the cutter to approximately the crest of the shank teeth and interconnecting all of the shank teeth at the heel end thereof, said web forming a continuation of the gauge face of the cutter, and notches extending through the peripheral edge of the web and opening into each space between adjacent shank teeth, the bottoms of said notches being spaced from the roots of said teeth.

4. A rotary bit comprising, a body, a rolling cutter rotatably mounted on the body for rolling contact with the bottom of a hole being dug, one end face of the cutter providing a gauge face positioned to cut the side wall of a hole, a row of shank teeth arranged circumferentially about the heel end of and extending longitudinally of the cutter, a circumferential web extending outwardly from the cutter body to approximately the crest of the shank teeth and interconnecting the shank teeth at the heel end thereof, said web forming a continuation of the gauge face of the cutter, spaced grooves in the gauge face and web extending substantially radially of the rotational axis of the cutter and having a depth less than the thickness of the web along a substantial portion of the web extending from the roots of said shank teeth so as to form alternate pads and mud grooves in the gauge face and web, and notches extending through the peripheral edge of the web and interconnecting the grooves and the space between adjacent shank teeth, the bottoms of said notches being spaced from the roots of said teeth.

5. A rotary bit comprising, a body, a rolling cutter rotatably mounted on the body for rolling contact with the bottom of a hole being dug, one end face of the cutter providing a gauge face positioned to cut the side wall of the hole, a row of shank teeth arranged circumferentially about the heel end of the cutter, said teeth extending longitudinally of the cutter, a circumferential web extending outwardly from the body of the cutter to approximately the crest of the shank teeth and interconnecting each pair of adjacent shank teeth at the heel end thereof, said web forming a continuation of the gauge face of the cutter, a plurality of equally spaced apart grooves cut in the gauge face to form alternate pads and mud grooves in the gauge face of the cutter, said grooves and pads and shank teeth being equal in number and of uniform size and shape, and notches in the peripheral edge of the web interconnecting the grooves and the spaces between adjacent shank teeth, the bottoms of said notches being spaced from the roots of said teeth and said grooves being of a depth less than the thickness of the web.

6. A rotary bit comprising, a body, a rolling cutter rotatably mounted on the body for rolling contact with the bottom of a hole being dug, one end face of the cutter providing a gauge face positioned to cut the side wall of the hole, a row of shank teeth arranged circumferentially about the heel end of the cutter, said teeth extending longitudinally of the cutter, a circumferential web extending outwardly from the body of the cutter to approximately the crest of the shank teeth and interconnecting each pair of adjacent shank teeth at the heel end thereof, said web forming a continuation of the gauge face of the cutter, a plurality of equally spaced apart grooves cut in the gauge face to form alternate pads and mud grooves in the gauge face of the cutter, said grooves cut deeper into the web, but not completely therethrough, than into the body of the cutter, said grooves and pads and shank teeth being equal in number and of uniform size and shape, and notches in the peripheral edge of the web interconnecting the grooves and the spaces between adjacent shank teeth, the side walls of said notches extending substantially radially of the rotational axis of the cutter, and the bottoms of said notches being spaced from the roots of said teeth.

7. A rolling cutter for a rotary bit comprising, a cutter body adapted to roll on the bottom of a hole being dug with one end face of the body providing a gauge face, a row of shank teeth arranged circumferentially about the heel end of and extending longitudinally of the cutter body, a circumferential web extending outwardly from the cutter body to approximately the crest of the shank teeth and interconnecting at least a pair of shank teeth at the heel end thereof, said web forming a continuation of the gauge face of the cutter, and a notch extending through the peripheral edge of the web and opening into the space between adjacent shank teeth, the bottom of said notch being spaced from the root of said teeth.

8. A rolling cutter for a rotary bit comprising, a cutter body adapted to roll on the bottom of a hole being dug with one end face of the body providing a gauge face, a row of shank teeth arranged circumferentially about the heel end of and extending longitudinally of the cutter body, a circumferential web extending outwardly from the body of the cutter to approximately the crest of the shank teeth and interconnecting the shank teeth at the heel end thereof, said web forming a continuation of the gauge face of the cutter body, spaced grooves in the gauge face and web extending substantially radially of the rotational axis of the cutter body and having a depth less than the thickness of the web along a substantial portion of the web extending from the roots of said shank teeth so as to form alternate pads and mud grooves in the gauge face and web, and notches extending through the peripheral edge of the web and interconnecting the grooves and the space between adjacent shank teeth, the bottoms of said notches being spaced from the roots of said teeth.

References Cited in the file of this patent

UNITED STATES PATENTS

| | | |
|---|---|---|
| 959,540 | Hughes | May 31, 1910 |
| 2,527,838 | Morlan et al. | Oct. 31, 1950 |
| 2,533,258 | Morlan et al. | Dec. 12, 1950 |
| 2,533,260 | Woods | Dec. 12, 1950 |